Aug. 10, 1965

N. B. HANSON 3,199,690

SILO UNLOADER

Filed May 22, 1963

INVENTOR.
NEWELL B. HANSON
BY
Merchant, Merchant & Gould
ATTORNEYS

Aug. 10, 1965  N. B. HANSON  3,199,690
SILO UNLOADER

Filed May 22, 1963 3 Sheets-Sheet 2

INVENTOR.
NEWELL B. HANSON
BY
Merchant, Merchant & Gould
ATTORNEYS

Aug. 10, 1965                    N. B. HANSON                    3,199,690
                                 SILO UNLOADER
Filed May 22, 1963                                          3 Sheets-Sheet 3
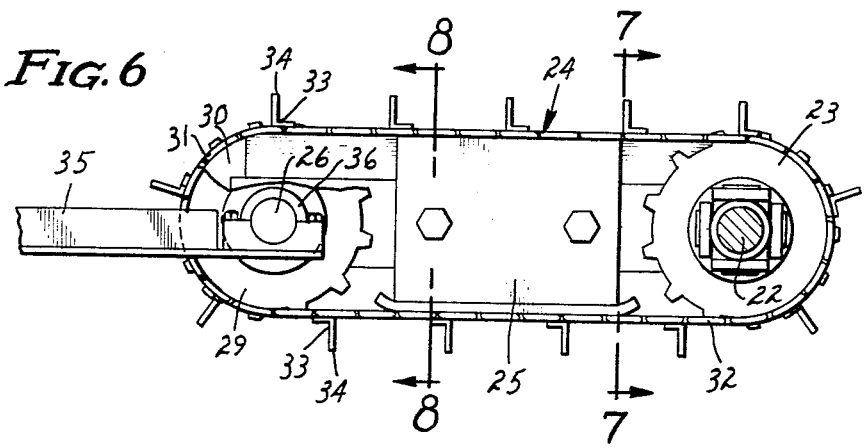
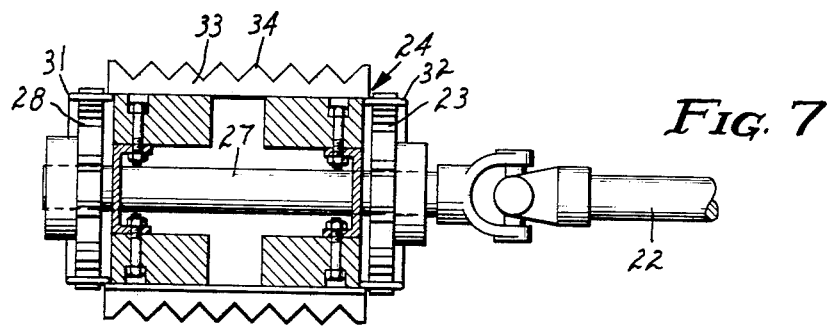
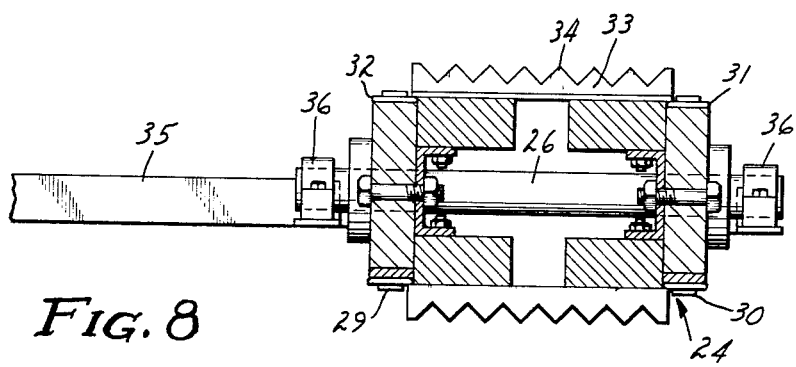
INVENTOR.
NEWELL B. HANSON
BY
Merchant, Merchant & Gould
ATTORNEYS 3,199,690
SILO UNLOADER
Newell B. Hanson, Lake Lillian, Minn., assignor to Hanson Silo Company, Lake Lillian, Minn., a corporation of Minnesota
Filed May 22, 1963, Ser. No. 282,436
1 Claim. (Cl. 214—17)

My invention relates generally to silo unloaders and more particularly to improvements of silo unloaders of the suspended type such as is disclosed in Patent #2,719,058.

Silo unloaders constructed in accordance with the above-identified patent incorporate a pair of laterally spaced radially extended feed augers which rotate in opposite directions to break loose and deliver surface ensilage from a silo in which they are operating. However, in extremely cold weather wherein the ensilage becomes tightly frozen, such unloaders have proven highly inefficient.

The primary object of my invention is the provision of novel means whereby, under even most extreme conditions, the surface ensilage may be efficiently loosened and delivered to a centrally located pick up and discharge means. To this end I substitute an ensilage chopping rotor for the lead feed auger and rotate both the chopper and feed auger in a common direction against the direction of travel of the unloader, preferably with the rotary chopper rotating at speeds approximately three times that of the feed auger.

A further object of my invention is the provision of a device of the class immediately above described which is relatively inexpensive to produce, is rugged and durable in operation, and highly efficient.

The above and still further objects of my invention will become apparent from the following detailed specification, appended claim and attached drawings.

Referring to the drawings, wherein like characters indicate like parts throughout the several views:

FIG. 6 is a fragmentary view in side elevation as seen from the line 6—6 of FIG. 1, greatly enlarged;

FIG. 7 is a view in vertical section as seen from the line 7—7 of FIG. 6;

FIG. 8 is a view in vertical section as seen from the line 8—8 of FIG. 6 and on the same scale as FIG. 7;

Figure 1:
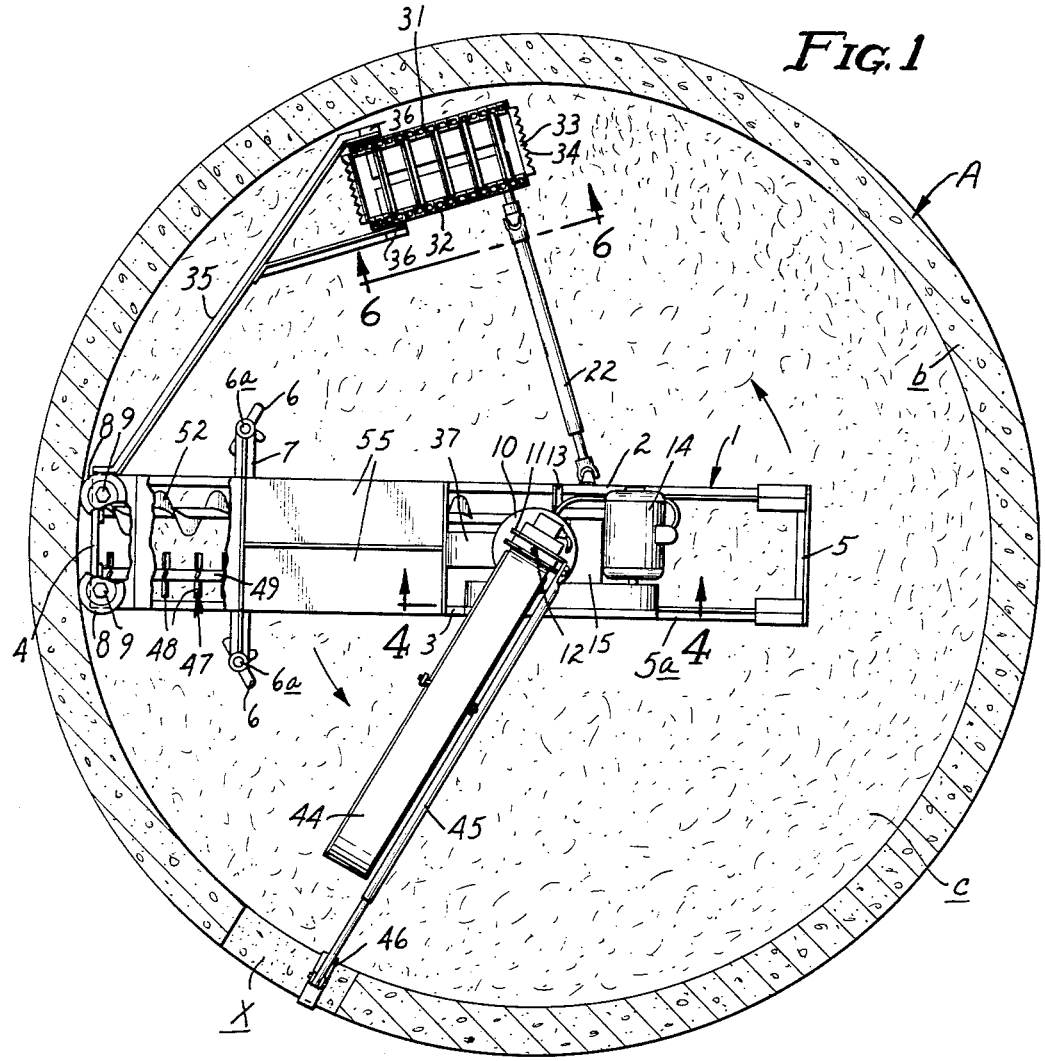
FIG. 1 is a view in horizontal section of a silo showing my novel unloader in top plan therein, some parts being broken away.

Referring with greater particularity to the drawings, the letter A identifies a silo, the cylindrical wall of which is identified by $b$ and the ensilage within the silo A by $c$.

My novel silo unloader includes a generally elongated rectangular frame 1, the longitudinally extended opposite side frame members thereof being identified by 2, 3, respectively, the radially outer end frame member by 4 and the radially inner end frame member by 5. As shown, the longitudinal dimensions of the frame 1 are greater than the radius of the cylindrical wall $b$ of the silo A, but considerably less than the diameter thereof. Mounting the radially outer end portion of the frame 1 for movement over the ensilage $c$ is a pair of castor wheels 6 which are journalled on vertical axes $6a$ on opposite ends of a mounting bracket 7. Spacing the outer end of frame 1 from the cylindrical wall $b$, for rotary movements thereon, are a pair of laterally spaced horizontally disposed guide rollers 8, the vertical axes thereof being identified by 9.

Shown as being secured to a head 10 is a lifting yoke 11, to the upper end of which is secured a suspension cable 12. Cable 12, in conventional manner, is secured to a winch, not shown, for raising and lowering the frame 1 and parts carried thereby, as desired. Head 10 is secured to the frame 1 in a manner hereinafter to be described in detail. It suffices for the moment to say that it is positioned on the frame 1 substantially on the vertical axis of the silo A.

Rigidly mounted on the radially inner end portion $5a$ of the frame 1, through subframe members 13, is an electric motor identified at 14. Motor 14 is operatively connected to a conventional gear reduction unit 15 through flexible drive connections 16 such as V-belts and entrained over a suitable pulley 17 on the motor drive shaft 18 and on pulley 19 on the input shaft 20 associated with gear reduction box 15. Gear reduction box 15 has projecting from one end thereof a power output shaft 21 which, through the medium of a telescoping universal joint equipped drive shaft 22, is connected to the drive sprocket 23 of a crawler type drive unit identified in its entirety by 24. Preferably, and as shown, the crawler unit 24 comprises a supporting frame 25 in which are mounted front and rear rotary shafts 26, 27, respectively, the latter at its radially inner end having the drive sprocket 23 fast thereon and having a second sprocket 28 at its outer end. Front shaft 26, on the other hand, has a pair of sprockets 29 and 30 on its radially inner and outer ends respectively. Entrained over the sprockets 23, 28, 29 and 30 are conventional link chains 31, 32 which, in turn, have transverse traction bars 33 extending therebetween and preferably, and as shown, being serrated along their longitudinally extended radially outer edges 34 for increased traction.

Maintaining the crawler unit 24 in a position to impart rotary movements to the frame 1 in the direction of the arrows of FIG. 1, is an arm 35, rigidly secured at its forward end to the radially outer end of the frame 1 and at its bifurcated rear end to opposite ends of the rotary shaft 26 through the medium of bearings or the like 36.

Figure 5:
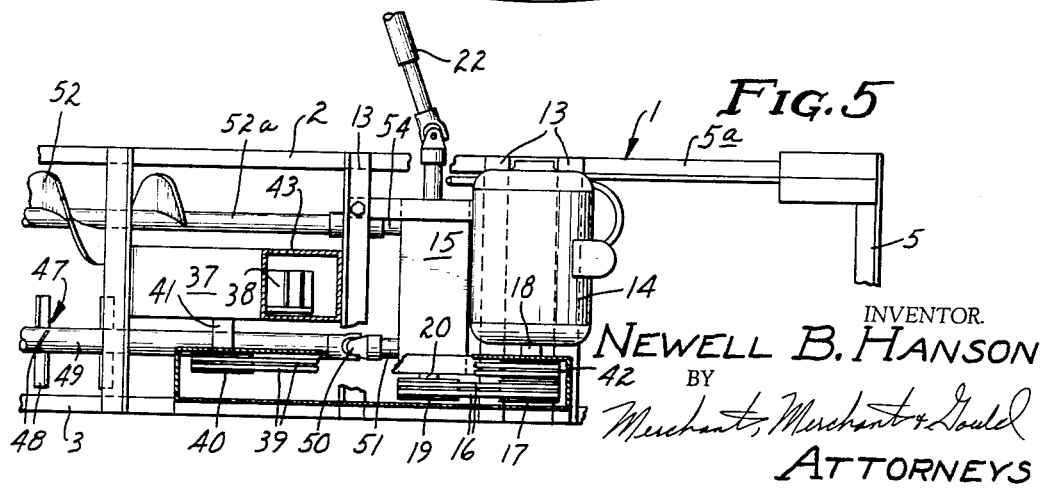
FIG. 5 is a view in horizontal section as seen from the line 5—5 of FIG. 2, on an enlarged scale.
Figure 2:
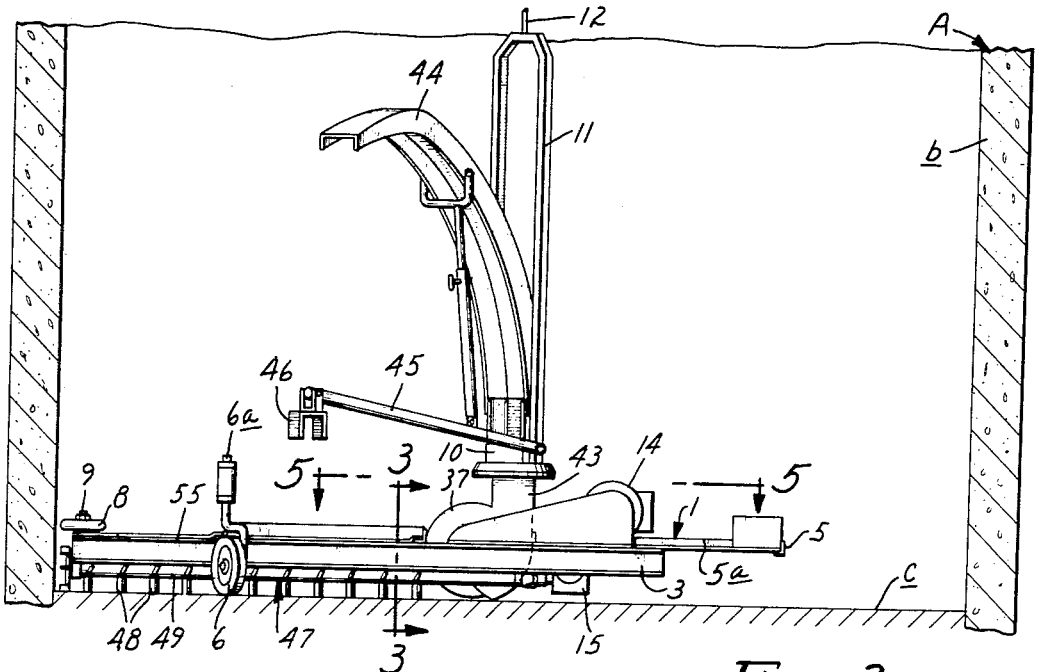
FIG. 2 is a view in vertical section of the silo in FIG. 1 and showing my novel device in side elevation.
Figure 4:
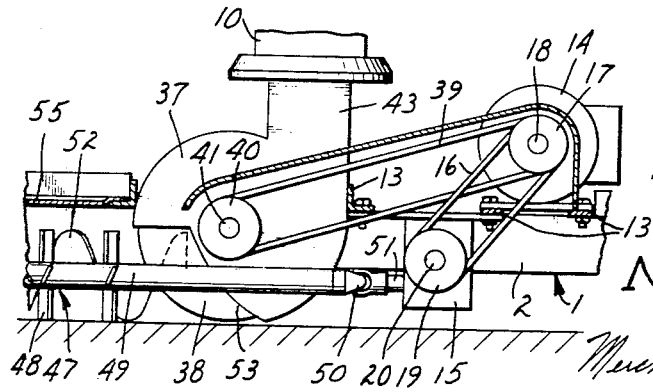
FIG. 4 is a view in vertical section as seen from the line 4—4 of FIG. 1, on an enlarged scale.

Rigidly mounted on the frame 1, intermediate the side frame members 2, 3, is a conventional blower, the housing of which is identified as at 37 and the impeller by 38. Rotary movements are imparted to the impeller 38 through the medium of a flexible drive belt 39 entrained over a pulley 40 on the impeller drive shaft 41 and over a pulley 42 on the motor drive shaft 18, as shown particularly in FIGS. 4 and 5. Head 10 is tubular in nature and in conventional manner is mounted for relative rotation on the upper discharge end 43 of the blower housing 37. A conventional discharge spout 44 is secured to the upper end of the tubular head 10 and is maintained in register with discharge opening $x$ of the silo A by means of telescoping arm 45 having a conventional gripping hand 46 at its radially outer end.

Mounted for rotation in a counterclockwise direction on a horizontal axis in the frame 1 immediately rearwardly of the leading edge defined by the side frame member 3 is a radially extended chopping rotor 47 which, as shown, comprises a plurality of longitudinally and circumferentially spaced radially projecting chopper blades 48 secured at their radially inner ends to a rotary shaft 49. As shown, the chopping rotor 47 extends from a point immediately adjacent the extreme radially outer end of the frame 1 to a point adjacent the blower housing 37 where it is connected through universal joint 50 to a power shaft 51 projecting radially outwardly from the side of the gear reduction unit 15.

Figure 3:
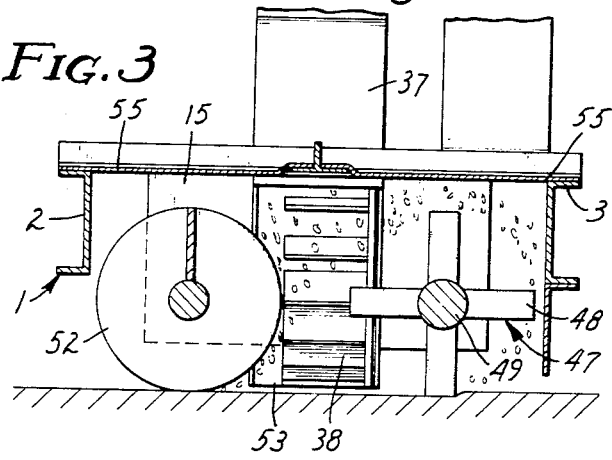
FIG. 3 is an enlarged view in vertical section as seen from the line 3—3 of FIG. 2.

Suitably journalled in the frame 1 in laterally spaced relation to the chopping rotor 47 is a feed auger 52 which, as in the case of the chopping rotor 47, extends from the extreme radially outer end of the frame 1 to a point adjacent to but laterally spaced from, the blower housing 37 whereby to feed ensilage loosened by the chopping rotor 47 into the impeller blade 38 through opening 53, when rotation is imparted to the feed auger 52 also in a counterclockwise direction with respect to FIG. 3.

Figure 9:
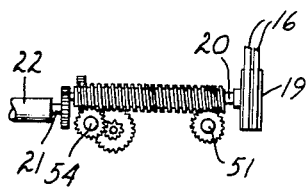
FIG. 9 is a view of a form of gearing utilizable to achieve different speeds of rotation of the feed auger and chopping rotor.
Figure 10:
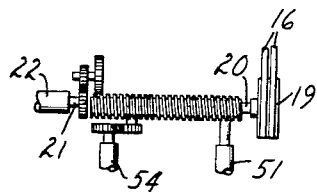
FIG. 10 is a plan view of the structure shown in FIG. 9.

It might here be stated that it is an important feature of this invention that rotary motion be imparted to the chopping rotor 47 at a ratio of approximately three to one relative to feed auger 52. FIGS. 9 and 10, as above indicated, disclose suitable gearing for accomplishing this important effect. As there shown, the radially inner end of the shaft 52a of the feed auger 52 is connected to the gear reduction unit through power output shaft 54.

Referring again to FIG. 3 it will be noted that the lower extremities of the chopping rotor 47 and the feed auger 52 lie in approximately the same horizontal plane. Under this arrangement the chopping rotor 47 does substantially all the loosening of the ensilage c while the primary function of the feed auger 52 is conveying of such loosened ensilage to the impeller blades 38 as the frame 1 is rotated in a counterclockwise direction, as indicated by the arrows in FIG. 1. Attention is directed to FIG. 3 which illustrates the path imparted to the loosened ensilage c by the chopping rotor 47 beneath the hood-like shroud 55.

My invention has been thoroughly tested and found to be completely satisfactory for the accomplishment of the above objects, and while I have shown a preferred embodiment thereof, I wish it to be understood that same may be capable of modification without departure from the scope and spirit of the appended claim.

What is claimed is:

In a silo unloader,
(a) an elongated frame adapted to be suspended over ensilage to be unloaded and having longitudinal dimensions greater than the radius but less than the diameter of a silo in which it is to be used,
(b) cable means suspending the radially inner end portion of said frame for rotation about an axis concentric with the vertical axis of the silo,
(c) wheel means mounting the radially outer end portion of said frame for movements over the ensilage within said silo,
(d) guide roller means on the extreme radially outer end of said frame adapted to engage the cylindrical wall of said silo during rotary movements of said frame,
(e) a radially extended chopping rotor journalled in said frame immediately rearwardly of the leading edge thereof and extending from the radially outer end of said frame to a point adjacent to but laterally offset in one direction with respect to said suspension cable,
(f) an axially extended feed auger mounted for rotation in said frame in rearward laterally spaced parallel relation to said chopping rotor and extending from the radially outer end of said frame to a point adjacent to said suspension cable but laterally offset therefrom in the opposite direction,
(g) and impeller equipped ensilage pickup and discharge means mounted in said frame adjacent the delivery end of said auger,
(h) shroud means cooperating with said frame to define a downwardly opening housing for said chopping rotor and said feed auger,
(i) means imparting relatively higher speed rotation to said chopping rotor than to said feed auger in a common direction against the direction of rotation of said frame,
(j) power means for imparting rotation to said frame about the axis of said suspension cable,
(k) and having a plurality of series of radially projecting cutting and chopping blades thereon which are rotated at a speed materially greater than that of the feed auger and at a speed sufficient to throw the cut and chopped ensilage onto the feed auger.

References Cited by the Examiner

UNITED STATES PATENTS

| | | | |
|---|---|---|---|
| 2,801,137 | 7/57 | Clay | 302—56 |
| 2,858,033 | 10/58 | Hofer | 302—56 |
| 2,864,655 | 12/58 | Caron | 302—56 |

SAMUEL F. COLEMAN, *Primary Examiner.*

ANDRES H. NIELSEN, *Examiner.*